Sept. 6, 1932.     V. WILLOUGHBY     1,876,185
ARTICULATED CAR
Filed Nov. 1, 1930     3 Sheets-Sheet 3
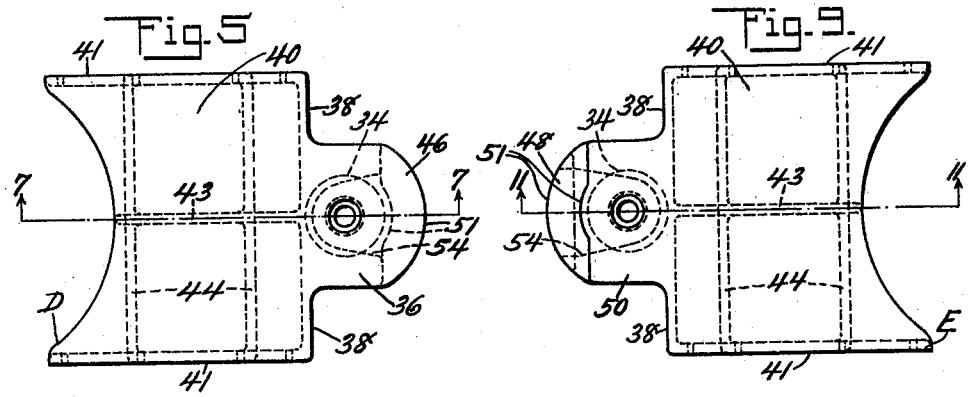
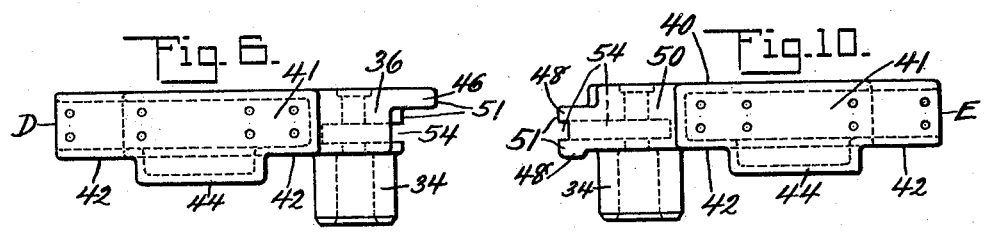
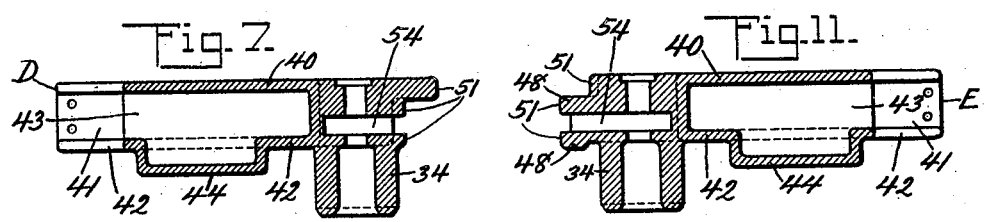
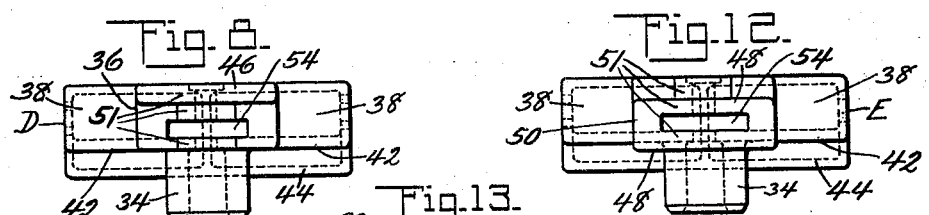
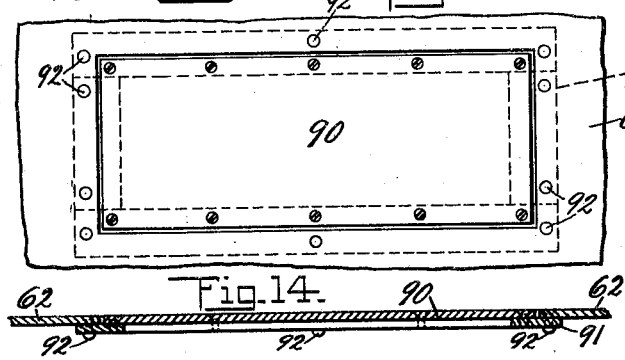
INVENTOR
Victor Willoughby
BY J. H. Gibbs
ATTORNEY Patented Sept. 6, 1932

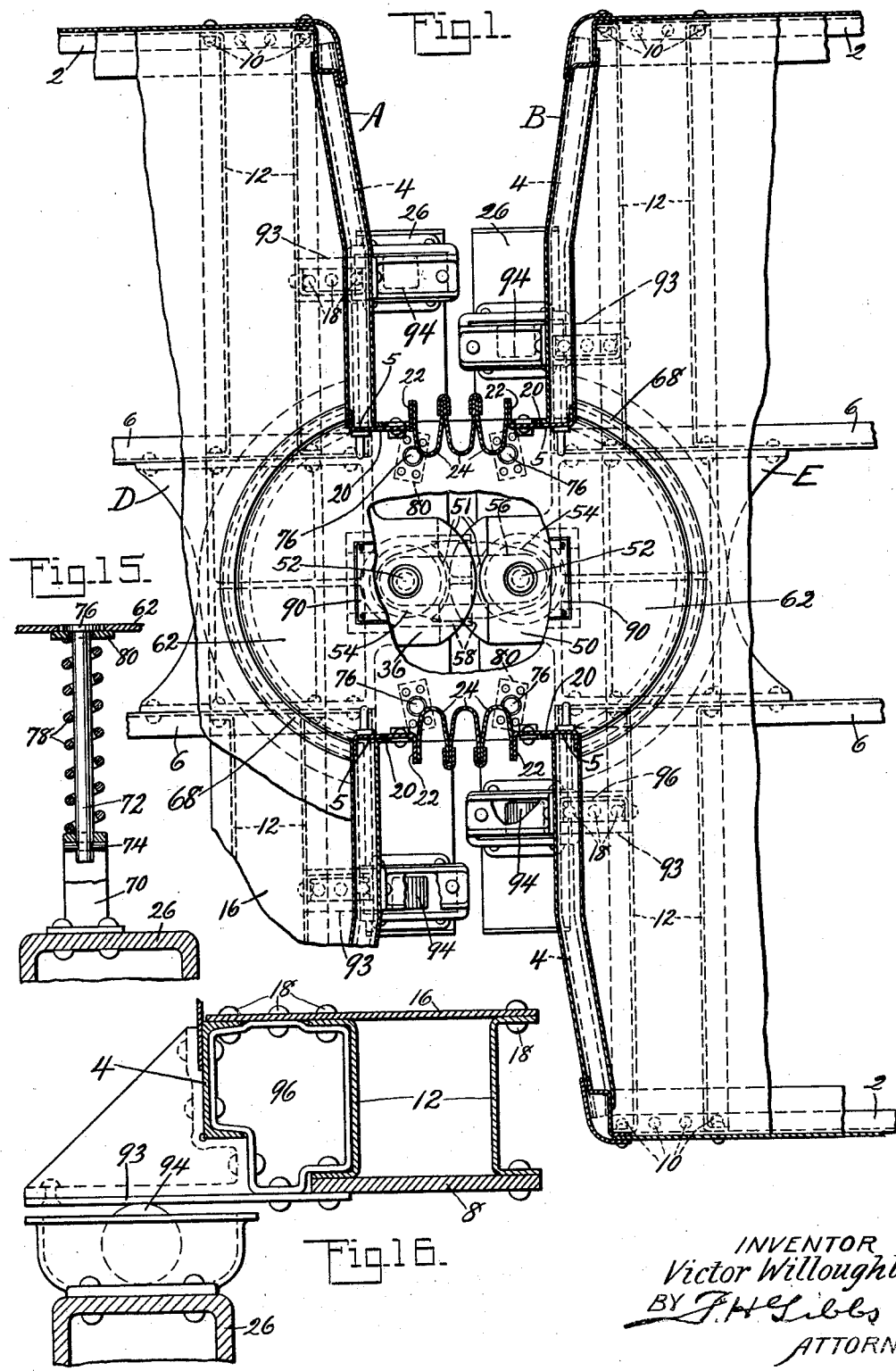

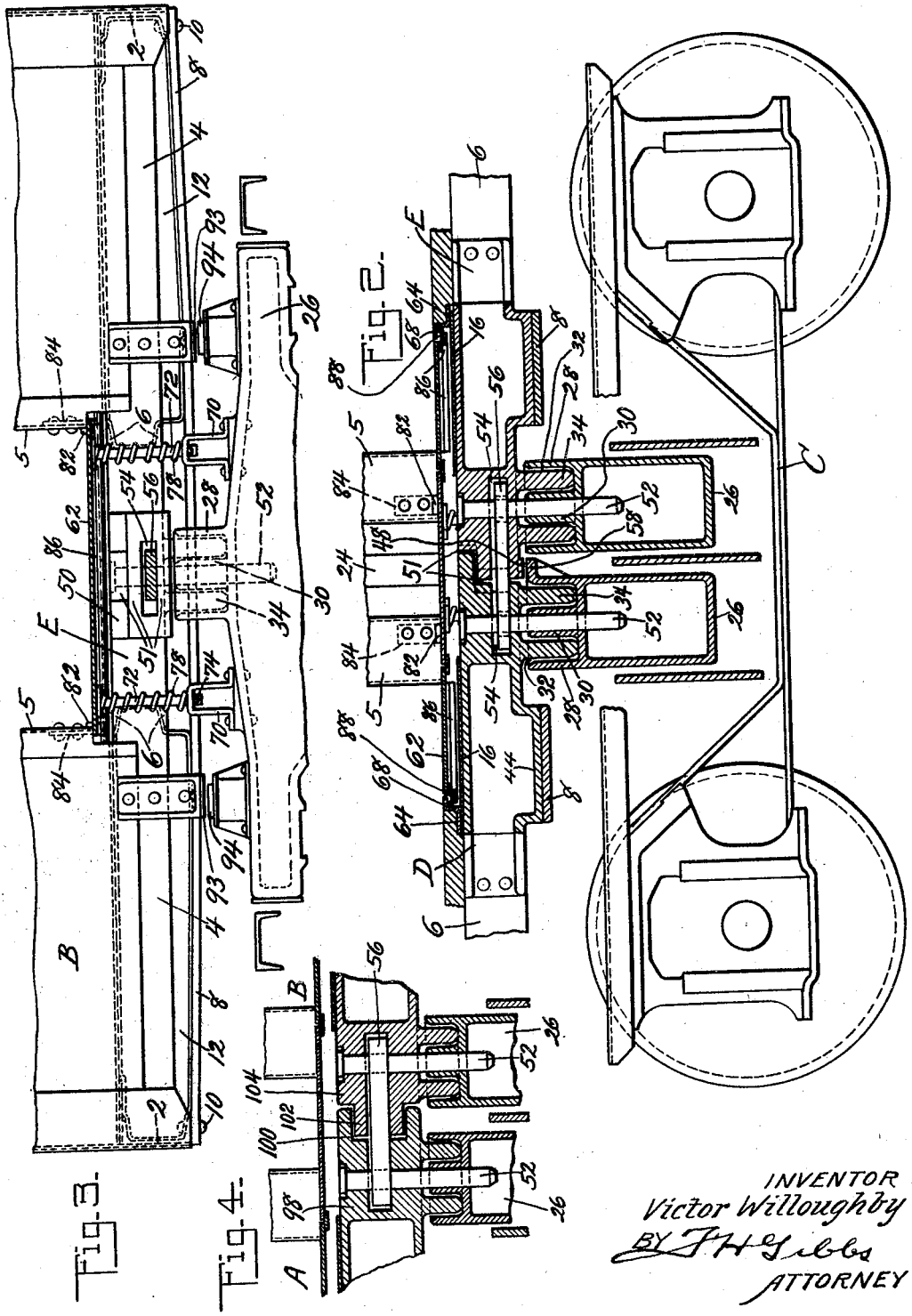

1,876,185

UNITED STATES PATENT OFFICE

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY

ARTICULATED CAR

Application filed November 1, 1930. Serial No. 492,689.

This invention relates to railway vehicles and has particular reference to articulated cars of the type which comprise a plurality of car bodies having their adjacent ends supported by a common truck arranged therebeneath and known in the art as a pivot truck.

One object of this invention is the provision of an articulated car formed of a plurality of car bodies, the adjacent ends of which are supported by independent, spaced truck bolsters.

Another object of this invention is the provision of an articulated car formed of a plurality of car bodies, the adjacent ends of which are connected to independent, spaced bolsters by means of center bearings on the bolsters which are engaged by center bearings carried by the adjacent end portions of the car bodies respectively.

Still another object of this invention is the provision of new and improved means for connecting the adjacent end portions of two bodies of an articulated car.

A further object of the invention is the provision of an articulation joint for the adjacent end portions of two car bodies wherein means are provided for transmitting traction stresses from the bodies to a truck, and wherein coupling means for the adjacent bodies is provided which also prevents relative lateral shifting between the bodies.

A still further object of the invention is the provision of a connection for the adjacent end portions of adjacent car bodies of an articulated car which includes interconnected or interfitted car body connection castings which prevent relative shifting of the adjacent bodies and which are adapted to take buffing shocks to which the bodies are subjected.

This invention further contemplates the provision of a new and improved body connection casting.

In order to permit passengers to pass from one car body to the other a foot plate between the adjacent end portions of the car bodies is provided and the present invention contemplates a means for supporting the foot plate in such a manner as to maintain the same in proper position irrespective of the relative positions of the car bodies.

Other objects and advantages of this invention will be apparent from the following description taken in conjunction with the following drawings in which Figure 1 is a top plan view showing the adjacent end portions of adjacent car bodies more or less diagrammatically; the figure having certain parts broken away, other parts shown in section, and still other parts omitted in order to more clearly show the invention.

Fig. 2 is a sectional view through the articulation joint of the present invention, the view also showing, more or less diagrammatically, a portion of a car truck.

Fig. 3 is an end view of one of the car bodies.

Fig. 4 is a sectional view of a modified form of articulation joint.

Fig. 5 is a top plan view of one of the body connection castings.

Fig. 6 is a side elevation of the casting shown in Fig. 5.

Fig. 7 is a sectional view on the line shown as 7—7, Fig. 5.

Fig. 8 is a front elevation of the casting shown in Fig. 5.

Fig. 9 is a top plan view of the body connection casting for the other car body, the same being a companion casting to that shown in Fig. 5.

Fig. 10 is a side elevation of the casting shown in Fig. 9.

Fig. 11 is a sectional view on the line 11—11, Fig. 9.

Fig. 12 is a front elevation of the casting shown in Fig. 9.

Fig. 13 is a top plan view of a portion of the foot plate.

Fig. 14 is a sectional view of the portion of the foot plate shown in Fig. 13.

Fig. 15 is a fragmentary view, the same showing a portion of a truck bolster with the supporting means for the foot plate shown attached thereto, and Fig. 16 is a sectional view showing a portion of the car underframe and also showing, in side elevation, the body and truck side bearings.

Referring now more particularly to the drawings, the end portions of adjacent car bodies are indicated generally at A and B; said bodies each having side sills 2 and an end sill, the latter comprising channels 4 extending from the side sills toward the longitudinal center line of the car bodies and being indicated in dotted lines in Figure 1 and one thereof being shown in section in Fig. 16. The end sill channels 4 extend to the center sills of the bodies A and B which center sills comprise spaced channels 6 (see Fig. 1). Adjacent the end sill of each body a cross bearer is arranged, the same comprising a plate 8 arranged transversely of the body and extending between and connected to the lower flanges of the side sills as shown at 10, and spaced diaphragms 12 arranged between and secured to the webs of the side sills and center sills by suitable fasteners such as rivets or the like; the cross bearers serving to stiffen the end portions of the car body underframes as will be apparent. End cover or floor plates 16 are arranged over the center sills, end sills, side sills and cross bearers of the respective bodies and are secured in place by suitable fasteners such as the rivets 18.

The end portions of bodies A and B are provided with doorways framed by U-shaped channel pieces, portions 20 of which define door posts 5. As shown clearly in Fig. 1, one flange 22 of each door post projects beyond the car body to which the channel piece is secured and serves as an attaching means for a U-shaped, flexible diaphragm 24 arranged between the bodies A and B and which provides a covered passageway for the articulated car.

Arranged beneath the adjacent end portions of bodies A and B is a pivot truck, indicated generally at C. For the greater part, the truck C is shown more or less diagrammatically and in the description to follow only the parts necessary to an understanding of the present invention will be specifically pointed out and described. The truck C includes spaced bolsters 26 which, in operation, are independent, and each thereof is provided with a truck center plate 28 which is circular in form and is provided with a centrally arranged vertical apertured lug 30; the lug defining an annular recess 32 which receives a circular body center bearing 34, formed with and depending from a body center casting indicated generally for body A at D and indicated generally at E for body B; the castings being companion castings which are secured to the respective car body underframes as presently to be described. As more clearly pointed out hereinafter, the castings D and E rest upon the plates 8 of the end cross bearers.

The specific construction of the castings D and E is shown in Figs. 5 to 12; Figs. 5 to 8 inclusive illustrating casting D for body A, while Figs. 9 to 12 inclusive illustrate casting E for body B; the figures being arranged in mating or companion relation for purposes of clearness.

The casting D is preferably of the form shown in Figs. 5 to 8 inclusive and comprises a body portion having a projection 36 extending from the front wall 38 thereof; the body portion having top and bottom walls 40 and 42 respectively and a longitudinal reinforcing rib 43 therebetween. The bottom wall 42 of casting D is provided with a projecting seating portion 44 which is adapted to rest upon the plate 8 as shown in Fig. 2, and the end projection 36 is undercut to provide an arcuate buffing portion 46 which overlaps the reduced forward end 48 of companion casting E; the latter, with the exception of the construction at the forward end thereof being similar in all respects to casting D, and hence the same reference numerals are applied thereto. As shown clearly in Figs. 9 to 12 inclusive, casting E is provided with a projection 50 at its forward end having a portion of its top surface cut away to provide the reduced end 48 heretofore mentioned which, when the car bodies are assembled, underlies the forward end of the projection 36.

Fig. 2 clearly shows the arrangement of the castings D and E when the car bodies are assembled and it will be apparent that the castings D and E are mating or companion castings; the mated or interfitting portions of the respective castings forming buffing areas indicated at 51. The interfitting projections of the castings D and E are each provided with a vertical aperture which, when the respective bodies are assembled as in Fig. 2, are aligned with the apertures in the lugs 30 and receive pivot locking pins 52 which extend into the apertures in said lugs; the pins having heads at the upper ends thereof which are countersunk in the respective castings. The castings D and E are provided with side walls 41, and said castings are of such size as to fit between the webs of channels 6 of the center sills with the side walls 41 in engagement with the webs of said channels to be secured thereto by suitable fasteners such as rivets or the like.

The castings D and E are further provided with horizontal recesses 54 which receive a coupling link 56 through which the pins 52 extend (see Fig. 2) to hold the link in position. The link 56 has a relatively loose fit in the aligned recesses 54 to permit relative vertical movement between the car bodies A and B but relative lateral shifting of the bodies is reduced to a minimum by the link and its connection, in the castings, through the medium of pins 52. Obviously sufficient clearance is provided in the arrangement and connection of the link 56 to prevent a too rigid construction and to permit the necessary flexibility between the adjacent bodies A and B to allow them to shift relatively in a lateral direction due to inequalities in track structure or other causes. It is not intended that the link 56 should prevent relative vertical movement of the car bodies A and B as this is accomplished by the interfitting of the castings D and E, and, referring to Fig. 2, it will be apparent that should body A tend to lower relative to body B, the projecting or overlapping portion 46 of casting D will contact with the reduced portion 48 of casting E and either be prevented from shifting vertically downward relative to body B or will transmit to casting E and hence body B, a portion of its load, thereby equalizing the load between the two bodies and causing the bodies to maintain a definite fixed relation with respect to each other. Should body A tend to raise or be elevated relative to body B, or vice versa, should body B tend to lower relative to body A, the reduced portion 48 of projection 50 of casting E will contact with a horizontally arranged abutment 58 formed with the bearing plate 28 on the bolster beneath car body A. The interfitting of the castings D and E further provides a means for taking buffing shocks to which the car bodies are subject as hereinbefore mentioned.

Reference has heretofore been made of the body center bearings 34 and it will be apparent from the drawings that these center bearings are formed with and depend from the end projections of the castings D and E; the center bearings 34 being circular in shape to fit the recesses 32 of the truck center bearings whereby to support the respective end portions of bodies A and B and to permit swivelling of said bodies about the truck center bearings as a center.

Between the adjacent bodies A and B a foot plate 62 is arranged, the same fitting between threshold castings 64 secured to the adjacent end portions of bodies A and B and comprising arcuate Z sections secured to top cover plates 16, hereinbefore mentioned; the Z sections having their upper flanges 68 facing each other to provide stops or abutments for retaining the foot plate 62 in proper position as hereinafter more clearly pointed out.

The present invention contemplates novel means for supporting the foot plate and now, referring to Figs. 1 and 15, it can be seen that the bolsters 26 are each provided on opposite sides of the center bearings with upright brackets 70 into which the lower ends of guide pins 72 extend, the latter having retaining keys 74 through their lower ends and having heads 76 at their upper ends arranged in openings formed in the foot plate 62. The foot plate is resiliently supported and normally urged upwardly by means of springs 78 encircling the pins 72 and bearing between the upper ends of brackets 70 and spring plates 80 on the pins 72 beneath the heads 76. The foot plate 62 is urged upwardly against the flanges 82 formed at the lower ends of plates 84 secured to the door posts 5 adjacent their lower ends.

The foot plate is stiffened by Z sections 86 secured to the under surface of the plate and having the lower flanges thereof extended under the flanges 68 of the threshold castings and provided with weather stripping 88. It will be apparent that due to the mounting of the foot plate as just described, the same is maintained in a substantially horizontal plane at all times, irrespective of the relative positions of the adjacent end portions of the bodies A and B.

To disassemble the articulated joint it is necessary to remove the pivot pins 52, and to permit this the foot plate 62 is provided with a removable portion 90 shown clearly in Figs. 13 and 14, supported by and secured to a frame 91 riveted as at 92 to the main portion of the foot plate 62.

Secured to the end sills of car bodies A and B and arranged on each side of the center castings are body side bearing wear plates 93 adapted to engage truck side bearings secured to the respective bolsters 26. In the present instance the truck side bearings are shown as rollers 94 but may of course assume any preferred or desired form. As shown clearly in Fig. 1, the side bearings are staggered on the two cars to permit the body side bearings to clear each other when the cars are passing around curves. In order to stiffen the bodies adjacent the side bearings, diaphragms 96 are provided which are arranged between the end sills 4 and the adjacent diaphragm 12 of the end crossbearer, as clearly shown in Fig. 16.

Fig. 4 discloses a modification of the articulation joint shown in Fig. 2 and it can be seen that the car bodies A and B are provided with center castings which are directly interengaged through the medium of a tongue and groove connection. The casting on car A is indicated at 98 in this Fig. 4 and is provided with a horizontally arranged groove 100 into which the projection or tongue 102 of the casting 104 of car B extends; this connection preventing relative vertical shifting of the car bodies as will be apparent.

From the above description it is believed that the construction of the car of the present invention will be fully apparent to those skilled in the art. In operation, in passing around curves, the two car bodies A and B will swivel in the center bearings. Buffing shocks to which the cars may be subjected are taken by the interfitted or interengaged center castings and relative lateral shifting between the car bodies is prevented, beyond that necessary due to inequalities in the tracks, by the link 56. Relative vertical shifting between the car bodies is prevented by the interengaged relation of the projections on the respective center castings.

As each car body is supported by its own truck bolster, bearing plates and side bearings, each body may oscillate or sway independently of or relative to the other.

The drawings herein disclose one embodiment of the invention but it is to be understood that the drawings are for illustrative purposes only and various changes in the form and proportions of the construction may be made within the spirit of the invention without departing from the scope of the appended claims.

What is claimed is:

1. In an articulated car, a truck comprising a plurality of bolsters, a plurality of car bodies having adjacent end portions arranged over the truck, interengaging body connection castings secured to the said adjacent end portions to prevent excessive relative vertical shifting of the car bodies, and body and truck center bearings connecting the bodies and truck.

2. In an articulated car, a truck comprising a plurality of bolsters, a center plate on each bolster, a plurality of car bodies, and interengaging center castings carried by the adjacent end portions of said bodies and each provided with a center plate for respectively engaging the truck center plates.

3. In an articulated car, a truck comprising a pair of independent bolsters each having a truck center plate, a plurality of car bodies, interengaged center castings carried by the adjacent end portions of said bodies and each having a body center bearing for engaging one of said truck center bearings, and a coupling link connecting the car bodies.

4. In an articulated car, a truck having a pair of bolsters each provided with a center plate, a pair of car bodies, body center castings carried by said bodies, said castings being interfitted to take buffing shocks and to prevent relative vertical shifting of said bodies, body center bearings formed with the castings and each engaging one of said truck center plates, a coupling link between said castings, and pivot pins securing said coupling link and extending into the bolsters.

5. In an articulated car comprising a plurality of car bodies, means for preventing excessive relative vertical and sidewise shifting of the bodies, comprising interengaged body center castings for preventing excessive relative vertical shifting, said castings having normally alined horizontal recesses formed in their adjacent ends, and a coupling link held in said recesses for preventing excessive relative sidewise shifting of the bodies.

6. In an articulated car comprising a plurality of car bodies, a truck beneath the adjacent ends of said bodies, interengaged body and truck bearings for connecting said bodies, interengaged body center castings above said bearings for preventing excessive relative vertical shifting of the bodies, and a rigid member extending between and connected to said ends for preventing excessive relative sidewise shifting of the bodies.

7. In an articulated car, a plurality of car bodies, a truck beneath the adjacent ends of said bodies, and means for connecting said bodies and truck comprising a pair of truck bolsters each provided with a center plate, overlapping center castings secured to the adjacent end portions of the car bodies, each provided with a depending center bearing respectively engaging the center plates on said bolsters, an abutment on one of said bolsters underlying one of the center castings and adapted to contact with the overlying casting upon excessive relative vertical shifting of one body whereby the bodies are maintained in substantially the same horizontal plane, and a coupling link extending between and secured to the adjacent castings for preventing excessive relative sidewise shifting of the car bodies.

8. In an articulated car, comprising a plurality of bodies and a single truck beneath the adjacent end portions thereof provided with a pair of bolsters and a pair of center plates, means connecting said bodies, a truck comprising body center castings secured to the adjacent end portions of said bodies and each provided with a center bearing adapted to engage one of the center plates, said castings having interengaging portions for preventing excessive relative vertical shifting of the bodies and having substantially abutting portions defining buffing areas and a pivot, the latter being arranged eccentric with respect to the center of rotation of said bearings.

9. In an articulated car comprising a plurality of car bodies and a single truck beneath the adjacent end portions thereof, connecting bearings between said bodies and truck, including spaced bolsters with which said bearings are engaged, a foot plate between the adjacent end portions of said bodies, supporting elements resiliently mounted on the bolsters on each side of the bearings and engaging the foot plate for normally urging the latter upwardly, and abutments secured to said bodies against which the foot plate is retained.

10. In an articulated car, a plurality of car bodies arranged end to end in substantially abutting relation, a truck for supporting the adjacent end portions of said bodies provided with a pair of bolsters arranged respectively beneath said end portions, center bearings between the end portions and their respective bolsters, and a coupling link connecting said bodies and so arranged as to prevent excessive relative sidewise shifting of the bodies.

11. In an articulated car, a plurality of car bodies arranged end to end in substantially abutting relation, a truck, a pair of bolsters carried by the truck and arranged respectively beneath the adjacent end portions of the car bodies, connected body and truck center bearings between the end portions and their respective bolsters, and means connecting the adjacent end portions of the bodies so arranged as to prevent excessive relative sidewise shifting of the bodies.

12. In an articulated car, a pair of car bodies arranged end to end in inter-engaged relation whereby excessive relative vertical shifting is prevented, and a rigid element extending between and connected to the adjacent end portions of the bodies, said element being so positioned as to prevent excessive relative sidewise shifting of the bodies.

In witness whereof I have hereunto set my hand.

VICTOR WILLOUGHBY.